(12) United States Patent
Bente

(10) Patent No.: US 6,925,677 B2
(45) Date of Patent: Aug. 9, 2005

(54) WIPING SYSTEM FOR WIPING A WINDOW, PARTICULARLY FOR MOTOR VEHICLE WINDOW PANE AND METHOD OF ASSEMBLING SAME

(75) Inventor: Eduard Bente, Eberdingen (DE)

(73) Assignee: Dr. Ing. h.c.F. Porsche AG, Weissach (DE)

(*) Notice: Subject to any disclaimer, the term of this patent is extended or adjusted under 35 U.S.C. 154(b) by 383 days.

(21) Appl. No.: 10/180,986

(22) Filed: Jun. 27, 2002

(65) Prior Publication Data
US 2003/0019092 A1 Jan. 30, 2003

(30) Foreign Application Priority Data
Jun. 27, 2001 (DE) .......................... 101 30 915

(51) Int. Cl.[7] .............. B60S 1/06; B60S 1/58; B60S 1/16
(52) U.S. Cl. ................... 15/250.3; 15/250.31
(58) Field of Search .................... 15/250.3, 250.31, 15/250.34, 250.16, 250.19; 296/96.15, 96.17

(56) References Cited

U.S. PATENT DOCUMENTS

| | | | | |
|---|---|---|---|---|
| 2,046,108 A | * | 6/1936 | Drew | 15/250.3 |
| 5,570,923 A | * | 11/1996 | Taylor | 296/164 |
| 5,621,942 A | * | 4/1997 | Eustache et al. | 15/250.3 |
| 6,606,760 B1 | * | 8/2003 | Koumo et al. | 15/250.3 |

FOREIGN PATENT DOCUMENTS

| | | | | |
|---|---|---|---|---|
| DE | 2728088 | * | 1/1978 | 15/250.3 |
| DE | 3313057 | * | 10/1984 | 15/250.3 |
| DE | 10011821 | | 9/2000 | |
| GB | 365603 | * | 1/1932 | 15/250.3 |
| GB | 1448892 | * | 9/1976 | 15/250.3 |

* cited by examiner

Primary Examiner—Gary K. Graham
(74) Attorney, Agent, or Firm—Crowell & Moring LLP

(57) ABSTRACT

A wiping arrangement is provided for wiping a transparent pane, particularly a motor vehicle window pane, having a driving motor on one side of the pane and a bearing unit with a wiper arm on the opposite side of the pane. The driving motor has a drive shaft and the bearing unit has a rotary shaft, while the drive shaft has a passage opening and the rotary shaft of the bearing unit has a blind hole and, for a precise positioning, the two openings are made to be congruent by means of a positioning device.

7 Claims, 1 Drawing Sheet

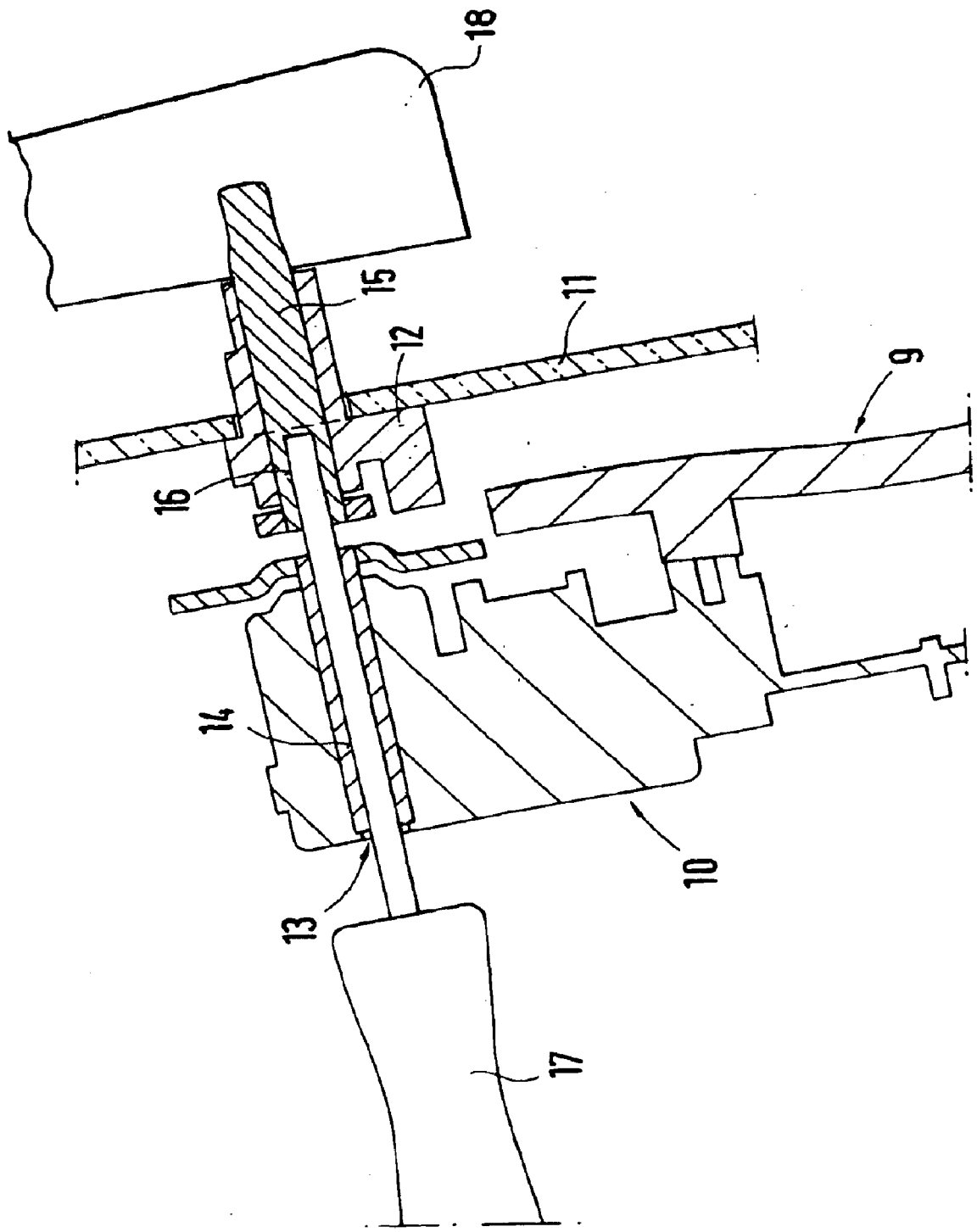

WIPING SYSTEM FOR WIPING A WINDOW, PARTICULARLY FOR MOTOR VEHICLE WINDOW PANE AND METHOD OF ASSEMBLING SAME

BACKGROUND OF THE INVENTION

This application claims the priority of Germany, filed Jun. 27, 2001, the disclosure of which is expressly incorporated by reference herein.

The invention relates to a wiping system for wiping a window pane having a driving motor on one side of the pane and a bearing unit with a wiper arm on the opposite side of the pane, the driving motor being connected with the bearing unit for transmitting the movement for a wiping movement of the wiper arm through an opening in the pane.

From German Patent Document DE 100 11 821 A1, a vehicle window wiping system is known which is situated between a rear door of a vehicle and a rear window which is opened independently of the door. In this case, the drive of the wiping system is provided on the rear door and the wiper arm is swivellably disposed on the rear window. When the rear window is closed, the wiper arm is connected with the drive. It is essential in the prior art that the window wiping system is easy to install and that it is prevented that the drive shaft is not aligned correctly with respect to the rotary shaft. When the rear window is closed, the axis of the rotary shaft has to be aligned with the axis of the drive shaft. For this purpose, a connection pin is provided in a connection opening in the window, which pin extends through the connection opening when the window is closed.

The present invention suggests a wiping system which, as a result of its arrangement, can be precisely aligned during the installation by means of simple devices and is also easy to mount in the event of a later removal and remounting.

In this case, it is advantageous that a commercially available object, such as a screwdriver, can be used as a positioning aid.

Embodiments of the invention are illustrated in the drawing and will be explained in detail in the following description.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a cross-sectional view of a motor with a drive shaft for a window wiping system and the rotary shaft for the wiper arm, in each case having a positioning device constructed according to a preferred embodiment of the present invention.

DETAILED DESCRIPTION OF THE EMBODIMENT

The figure is a schematic cross-sectional view of a preferred embodiment of the invention. This view concentrates on the important components, reference number 10 indicating a driving motor for the wiper arm 18. Relative to a window pane 11 shown only as a cutout, in the illustrated example, the driving motor 10 is arranged on an interior side of a rear door or tailgate 9. The wiper arm is arranged on an exterior side of the rear door 9 and window pane 11; and a bearing unit 12 of the wiper arm 18 is arranged on the interior side of the window pane 11. The shaft 13 of the driving motor 10 has a passage bore 14. The bearing unit 12 with its rotary shaft 15 has a blind hole 16.

During the mounting of the components of the wiping system situated on the tailgate and on the rear window, the passage bore 14 and the blind hole are to be arranged to be in alignment with one another. Because of the constructive design, this can take place rapidly and easily by means of a positioning device 17. A screwdriver, for example, can be used as the positioning device 17. For the mounting, this positioning device 17 is fitted through the passage bore 14 into the blind hole 16 of the shaft 15. When the bore 14 and blind hole are in alignment in a correct position by the device 17, the two components are fastened in this correct position.

Once the motor has been positioned in the correct position by the positioning device, the positioning device 17 is removed and replaced by a drive member which rotatably connects the shaft 13 with the rotary shaft 15 by way of a splined connection or the like.

Other existing components, such as sealing devices, will not be explained here in detail because they are not essential to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wiping system for wiping a transparent pane, particularly a motor vehicle window pane, having a driving motor on one side of the pane, a bearing unit, and a wiper arm on the opposite side of the pane, the driving motor being connected with the bearing unit for transmitting the movement for a wiping movement of the wiper arm through an opening in the pane,
   wherein a drive shaft of the driving motor has a longitudinally extending through passage and a rotary shaft of the bearing unit has a blind hole.

2. Wiping system according to claim 1,
   wherein, for a precise positioning, a positioning device fitted into the passage opening of the drive shaft reaches into the blind hole of the rotary shaft of the bearing unit.

3. Wiping system according to claim 1,
   wherein the positioning device is a screwdriver.

4. A vehicle assembly comprising,
   a transparent window pane,
   a driving motor on one side of the window pane,
   a bearing unit, and
   a wiper arm on an opposite side of the window pane, said bearing unit having a hole engageable by a drive shaft of the driving motor when in an assembled position,
   wherein said drive shaft has a longitudinally extending through passage for accommodating a positioning device which extends through said passage and engages in said hole to position the driving motor and bearing unit in a proper alignment before fastening the driving motor and bearing unit in the assembled position.

5. A vehicle assembly according to claim 4, wherein said hole is a blind hole.

6. A window pane wiping assembly comprising:
   a driving motor disposable at one side of a window pane,
   a bearing unit supportable on the window pane and having a wiper arm on an opposite side of the window pane, and said bearing unit having a hole engageable by a drive shaft of the driving motor when in an assembled position, wherein said drive shaft has a longitudinally extending through passage for accommodating a positioning device which extends through said passage and engages in said hole to position the driving motor and bearing unit in a proper alignment before fastening the driving motor and bearing unit in the assembled position.

7. An assembly according to claim 6, wherein said hole is a blind hole.

* * * * *